United States Patent
Wootton et al.

(10) Patent No.: US 10,017,147 B2
(45) Date of Patent: Jul. 10, 2018

(54) SAFETY DEVICE

(71) Applicant: Autoliv Development AB, Vårgårda (SE)

(72) Inventors: Gary Wootton, Stoke-on-Trent (GB); Hugh Finn, Warrington (GB)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/029,488

(22) PCT Filed: Oct. 13, 2014

(86) PCT No.: PCT/SE2014/051207
§ 371 (c)(1),
(2) Date: Apr. 14, 2016

(87) PCT Pub. No.: WO2015/057140
PCT Pub. Date: Apr. 23, 2015

(65) Prior Publication Data
US 2016/0264090 A1  Sep. 15, 2016

(30) Foreign Application Priority Data
Oct. 15, 2013  (EP) .................................... 13188640

(51) Int. Cl.
*B60R 21/2338* (2011.01)
*B60R 21/235* (2006.01)
(Continued)

(52) U.S. Cl.
CPC ........ *B60R 21/2338* (2013.01); *B60R 21/235* (2013.01); *D03D 1/02* (2013.01);
(Continued)

(58) Field of Classification Search
CPC .............. B60R 21/2338; B60R 21/235; B60R 2021/23509; B60R 2021/23542;
(Continued)

(56) References Cited

U.S. PATENT DOCUMENTS 6,742,805 B2 * 6/2004 Hill ....................... B60R 21/235
280/730.2
8,622,424 B2 * 1/2014 Finn .................... B60R 21/2338
280/743.1
(Continued)

FOREIGN PATENT DOCUMENTS

CA 2832745 A1 10/2012
EP 2407353 A1 1/2012

OTHER PUBLICATIONS

International Search Report and Written Opinion of the ISA for PCT/SE2014/051207, ISA/SE, Stockholm, dated Feb. 10, 2015.

*Primary Examiner* — Paul N Dickson
*Assistant Examiner* — Timothy Wilhelm
(74) *Attorney, Agent, or Firm* — Stephen T. Olson; Harness, Dickey & Pierce, P.L.C.

(57) ABSTRACT

A safety device for use in a vehicle includes an air-bag inflatable by a gas source. At least part of the air-bag is woven and includes a plurality of generally parallel woven yarns. An elongate tether is attached to the air-bag by an attachment arrangement including a first portion in which part of the tether passes between two adjacent yarns of the air-bag from one side to another side of the air-bag and partly around at least two adjacent yarns on one side of the air-bag. The arrangement incorporates a second portion in which the tether is interwoven with a pre-determined number of single adjacent yarns of the air-bag. The arrangement incorporates a third portion in which the tether passes between two adjacent yarns of the air-bag from one side to
(Continued)

another side of the air-bag and partly around at least two adjacent yarns on one side of the air-bag.

18 Claims, 5 Drawing Sheets

(51) Int. Cl.
*D03D 1/02* (2006.01)
*D03D 11/02* (2006.01)

(52) U.S. Cl.
CPC .... *D03D 11/02* (2013.01); *B60R 2021/23382* (2013.01); *B60R 2021/23509* (2013.01); *B60R 2021/23542* (2013.01); *B60R 2021/23547* (2013.01)

(58) Field of Classification Search
CPC ........... B60R 2021/23547; B60R 2021/23382; D03D 1/02; D03D 11/02
See application file for complete search history.

(56) References Cited

U.S. PATENT DOCUMENTS

| | | | |
|---|---|---|---|
| 9,283,922 B2* | 3/2016 | Fischer | B60R 21/2334 |
| 2007/0200329 A1* | 8/2007 | Ma | B60R 21/231 |
| | | | 280/743.1 |
| 2013/0113195 A1 | 5/2013 | Finn et al. | |
| 2015/0367807 A1* | 12/2015 | Becker | B60R 21/23 |
| | | | 280/743.1 |

* cited by examiner

Figure 1

PRIOR ART

SAFETY DEVICE

CROSS-REFERENCE TO RELATED APPLICATIONS

This application is a 371 U.S. National Stage of International Application No. PCT/SE2014/051207, filed Oct. 13, 2014, and published in English as WO 2015/057140 A1 on Apr. 23, 2015, which claims the benefit of and priority to European Patent Application No. 13188640.0, filed Oct. 15, 2013. The entire disclosures of the above applications are incorporated herein by reference.

DESCRIPTION OF INVENTION

Field

This invention relates to a safety device for use in a vehicle, and in particular concerns a safety device which incorporates an air-bag and a tether.

Background

An air-bag is typically at least partly formed from woven yarns. One piece woven (OPW) air-bags are now common since they can be formed rapidly and simply in a single operation on a weaving loom.

It is known to provide a tether between portions of an air-bag to restrict the expansion or movement of the air-bag upon inflation. A tether may be positioned internally within the air-bag or on the exterior of the air-bag.

In one example, tethers are positioned within an inflatable curtain (IC) type air-bag to maintain the air-bag in an appropriate shape, upon inflation.

It is known to attach a tether to an air-bag by weaving a portion of the tether between yarns of the material forming the air-bag. This attachment technique is typically used to attach a tether to an OPW airbag as the airbag is formed on a weaving loom.

Figure 1:
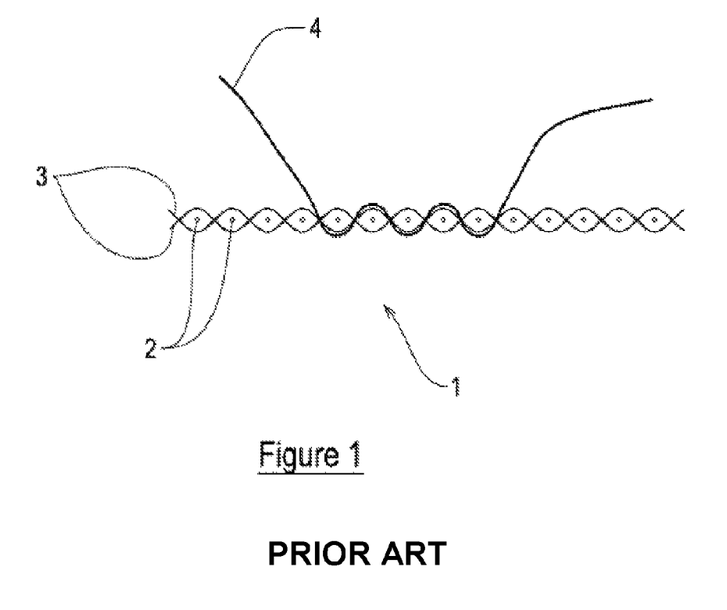
FIG. 1 is a diagrammatic sectional view of a tether attached to an air-bag in a conventional manner.

FIG. 1 of the accompanying drawings shows an example of a conventional tether attachment. A section of an air-bag 1 comprises a plurality of warp yarns 2 which are interwoven with a plurality of weft yarns 3. An elongate flexible tether 4 is attached to the air-bag 1 by part of the tether 4 being interwoven with five adjacent single warp yarns 2. The tether 4 is formed from a plurality of woven tether yarns and at least one of the tether yarns is interwoven with the warp yarns 2 of the air-bag 1. In FIG. 1, only one tether yarn is shown but it is to be appreciated that more than one tether yarn of the tether 4 may be interwoven with the warp yarns 2 of the air-bag 1 to attach the tether 4 to the air-bag 1.

The conventional attachment arrangement shown in FIG. 1 is effective in attaching the tether 4 to the air-bag 1. However, in certain circumstances, as the air-bag 1 inflates, the force exerted by the air-bag 1 on the tether 4 can cause the tether 4 to break and become disconnected from the air-bag 1. If the tether 4 becomes disconnected from the air-bag 1 then the tether 4 is no longer able to restrict the expansion or movement of the air-bag 1 in a correct manner.

SUMMARY

The present invention seeks to address at least the problem identified above.

According to one aspect of the present invention, there is provided a safety device for use in a vehicle, the safety device comprising: an air-bag configured to be inflated by a source of gas, at least part of the air-bag being woven; and comprising a plurality of generally parallel woven yarns; and an elongate tether, the tether being connected to the air-bag by a connection arrangement which comprises: a first portion in which part of the tether passes between two adjacent yarns of the air-bag from one side of the air-bag to another side of the air-bag and partly around at least two adjacent yarns of the air-bag on one side of the air-bag; a second portion in which part of the tether is interwoven with a predetermined number of single adjacent yarns of the air-bag; and a third portion in which part of the tether passes between two adjacent yarns of the air-bag from one side of the air-bag to another side of the air-bag and partly around at least two adjacent yarns of the air-bag on one side of the air-bag.

Preferably, in the first portion of the attachment arrangement, the tether passes partly around at least three adjacent yarns of the air-bag on one side of the air-bag.

Conveniently, in the second portion of the attachment arrangement, the tether is interwoven with at least seven adjacent single yarns of the air-bag.

Advantageously, in the second portion of the attachment arrangement, the tether is interwoven with at least thirteen adjacent single yarns of the air-bag.

Preferably, in the third portion of the attachment arrangement, the tether passes partly around at least three adjacent yarns of the air-bag on one side of the air-bag.

According to another aspect of the present invention, there is provided a safety device for use in a vehicle, the safety device comprising: an air-bag configured to be inflated by a source of gas, at least part of the air-bag being woven and comprising a plurality of generally parallel woven yarns; and an elongate tether connected to the air-bag by a connection arrangement which comprises a first portion in which part of the tether passes between two adjacent yarns of the air-bag from a first side of the air-bag to a second side of the air-bag and partly around at least three adjacent yarns of the air-bag on the second side of the air-bag, and between a further two adjacent yarns of the air-bag from the second side of the air-bag to the first side of the air-bag.

Conveniently, the connection arrangement comprises a second portion in which part of the tether is inter-woven with a plurality of single adjacent yarns of the air-bag.

Advantageously, the first and second portions of the connection arrangement are adjacent one another and the first portion of the connection arrangement is adjacent a seam of the air-bag such that the first portion of the connection arrangement is positioned between the seam and the second portion of the connection arrangement.

According to a further aspect of the present invention, there is provided a method of manufacturing a safety device for use in a vehicle, the method comprising: weaving part of an air-bag to comprise a plurality of generally parallel woven yarns; providing an elongate tether; and connecting the tether to the air-bag by: passing a first part of the tether between two adjacent yarns of the air-bag from one side of the air-bag to another side of the air-bag and partly around at least two adjacent yarns of the air-bag on one side of the air-bag; interweaving a second part of the tether with a predetermined number of single adjacent yarns of the air-bag; and passing a third part of the tether between two adjacent yarns of the air-bag from one side of the air-bag to another side of the air-bag and partly around at least two adjacent yarns of the air-bag on one side of the air-bag.

Preferably, the method comprises: passing the first part of the tether partly around at least three adjacent yarns of the air-bag on one side of the air-bag.

Conveniently, the method comprises interweaving the second part of the tether with at least seven single adjacent yarns of the air-bag.

Advantageously, the method comprises interweaving the second part of the tether with at least thirteen single adjacent yarns of the air-bag and passing the third part of the tether partly around at least three adjacent yarns of the air-bag on one side of the air-bag.

According to a still further aspect of the present invention, there is provided a method of manufacturing a safety device for use in a vehicle, the method comprising: weaving part of an air-bag to comprise a plurality of generally parallel woven yarns; providing an elongate tether; and attaching the tether to the air-bag by: passing part of the tether between two adjacent yarns of the air-bag from a first side of the air-bag to a second side of the air-bag and partly around at least three adjacent yarns of the air-bag on the second side of the air-bag; and passing part of the tether between a further two adjacent yarns of the air-bag from the second side of the air-bag to the first side of the air-bag.

Preferably, the method further comprises attaching the tether to the air-bag at a second portion of the connection arrangement by inter-weaving a part of the tether with a plurality of single adjacent yarns of the air-bag.

Conveniently, the first and second portions of the connection arrangement are adjacent one another and the first portion of the connection arrangement is adjacent a seam of the air-bag such that the first portion of the connection arrangement is positioned between the seam and the second portion of the connection arrangement.

BEST DESCRIPTION OF THE DRAWINGS

So that the present invention may be more readily understood, embodiments of the present invention will now be described, by way of example, with reference to the accompanying drawings, in which.

DETAILED DESCRIPTION

Figure 2:
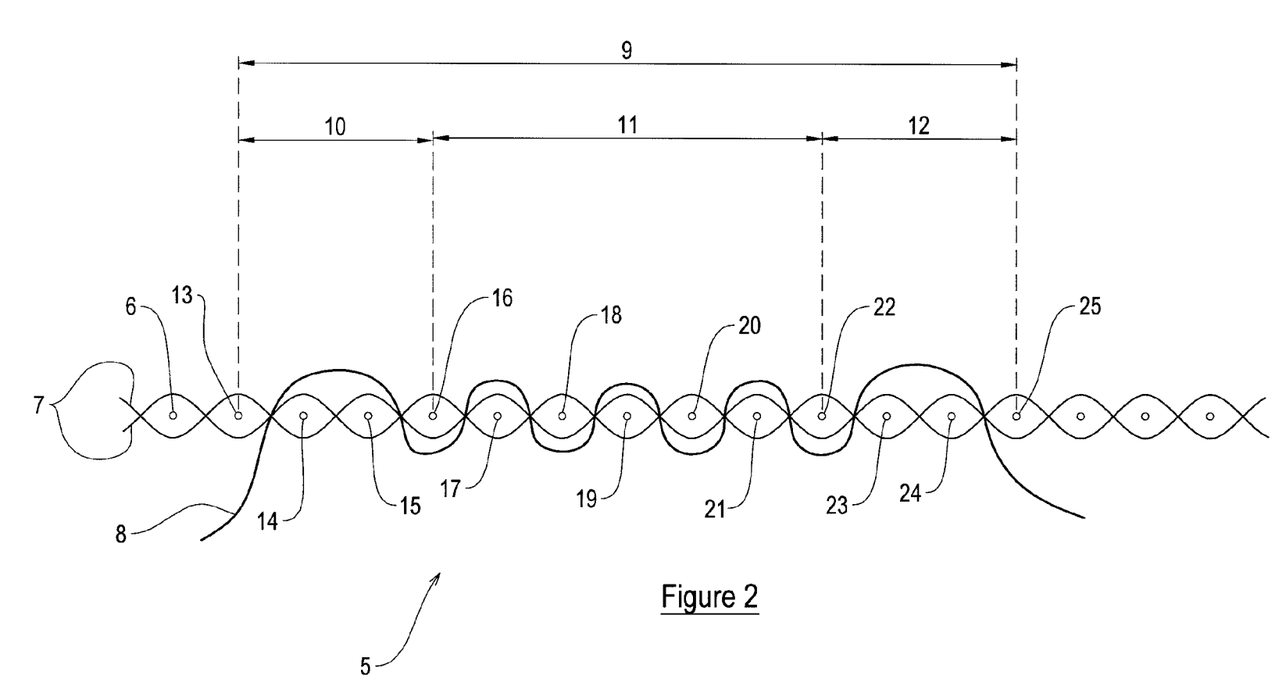
FIG. 2 is a diagrammatic sectional view of a preferred embodiment of the invention in which a tether is attached to an air-bag.

Referring now to FIG. 2, at least part of an air-bag 5 is woven and comprises a plurality of woven warp and weft yarns 6, 7. The woven warp yarns 6 form a plurality of generally parallel yarns. The woven weft yarns 7 also form a plurality of generally parallel yarns.

In one embodiment, the air-bag is a one piece woven (OPW) air-bag. However, in other embodiments, the air-bag 5 is formed using a different weaving technique to one piece weaving.

It is to be appreciated that FIG. 2 only shows one layer of part of the air-bag 5 and that the air-bag 5 may incorporate other layers.

In this embodiment, a flexible elongate tether 8 is attached to the air-bag 5 by an attachment arrangement 9. In a preferred embodiment, the tether 8 is formed from a plurality of woven tether yarns. Only one tether yarn is shown in FIG. 2 but, in this embodiment, the tether 8 comprises a plurality of tether yarns.

The attachment arrangement 9 comprises yarns 6 of the air-bag 5 which retain part of the tether 8 to attach the tether 8 to the air-bag 5. In this embodiment, at least one tether yarn of the tether 8 is retained by the attachment arrangement 9 to attach the tether 8 to the air-bag 5. For simplicity purposes, the following description refers to the tether 8 but it is to be appreciated that part of the tether 8 is attached to the air-bag 5 and the part of the tether 8 is at least one tether yarn of the tether 8.

In this embodiment, the attachment arrangement 9 comprises warp yarns 6 of the air-bag 5 but in other embodiments, the attachment arrangement 9 comprises weft yarns 7 of the air-bag 5. The tether 8 is preferably attached to the air-bag 5 during an OPW weaving process for forming the air-bag 5.

The attachment arrangement 9 comprises a first portion 10, a second portion 11 and a third portion 12. Each portion 10-12 of the attachment arrangement 9 comprises a respective number of warp yarns 6 of the air-bag 5 and an arrangement in which the tether 8 passes between or over the warp yarns 6.

In the first portion 10 of the attachment arrangement 9, the tether 8 passes between two adjacent warp yarns 13, 14 from one side of the air-bag 5 to another side of the air-bag 5 and partly around two adjacent warp yarns 14, 15 on one side of the air-bag 5. When the tether 8 passes partly around two or more adjacent warp yarns 6 on one side of the air-bags, the tether is said to "float" over adjacent warp yarns 6, as opposed to being interwoven between single warp adjacent yarns 6. The term "adjacent" is used here to mean two warp yarns that are positioned immediately next to one another.

In other embodiments, the tether 8 passes partly around more than two adjacent warp yarns 6 in the first portion 10 of the attachment arrangement 9. In one embodiment, the tether 8 passes partly around three adjacent warp yarns 6 in the first portion 10 of the attachment arrangement 9.

In the second portion 11 of the attachment arrangement 9, the tether 8 passes between two warp yarns 15, 16 from one side of the air-bag 5 to another side of the air-bag 5 and the tether 8 is interwoven with a predetermined number of single adjacent warp yarns 17-21. In the second portion 11 of the attachment arrangement 9, the tether 8 interwoven with seven adjacent single warp yarns 16-22. The tether 8 passes at least partly around three warp yarns 17, 19 and 21 on one side of the air-bag 5.

In other embodiments, the tether 8 interwoven with more than seven single adjacent warp yarns. In one embodiment, the tether 8 is interwoven with thirteen single adjacent warp yarns in the second portion 11 of the attachment 9.

In the third portion 12 of the attachment arrangement 9, the tether 8 passes between two adjacent warp yarns 22, 23 from one side of the air-bag 5 to another side of the air-bag 5 and then passes partly around two adjacent warp yarns 23, 24 on one side of the air-bag 5. The tether 8 then passes between a further two adjacent warp yarns 24, 25.

In other embodiments, the tether 8 passes partly around more than two adjacent warp yarns in the third portion 12 of the attachment arrangement 9. In one embodiment, the tether 8 passes partly around three adjacent warp yarns in the third portion 12 of the attachment arrangement 9.

In the embodiments described above, the tether 8 passes partly around at least two adjacent warp yarns in the first and third portions 10, 12 of the attachment arrangement 9. The tether 8 is interwoven with single adjacent warp yarns 16-21 in the second portion 11 of the attachment arrangement 9. Passing the tether 8 partly around at least two adjacent warp yarns on one side of the air-bag 5 in the first and third portions 10, 12 of the attachment arrangement 9 allows some movement between the tether 8 and air-bag 5 which absorbs some of the shock load when the air-bag 5 is inflated. This minimises the chance of the tether 8 breaking as the air-bag 5 is inflated.

To improve the performance of the air-bag 5, the length of the first and third portions 10, 12 of the attachment arrangement 9 is, in one embodiment, minimised with respect to the length of the second portion 11 of the attachment arrangement 9. This helps to minimise gas leakage from the air-bag at the point where the tether is attached to the air-bag.

Figure 3:
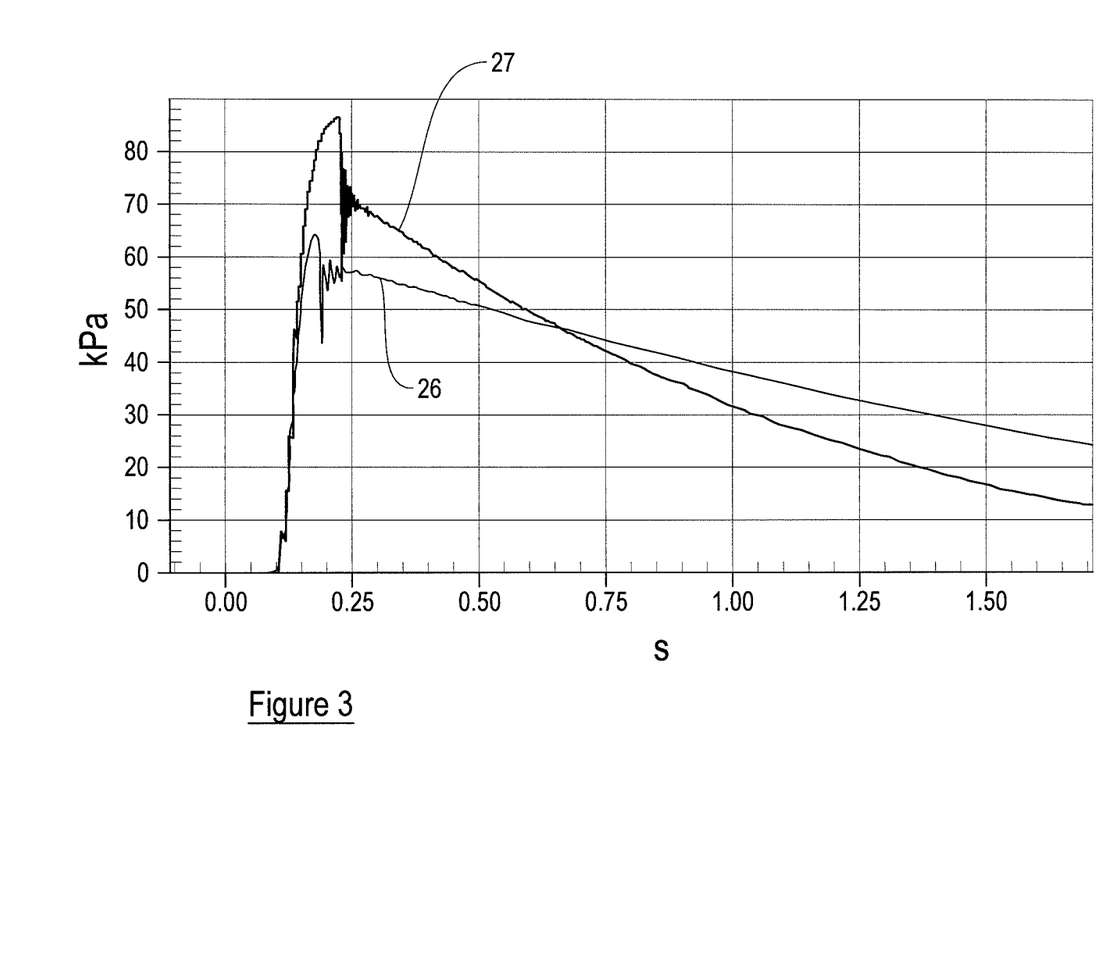
FIG. 3 is a graph showing the results of burst test experiments carried out on an embodiment of the invention and a conventional baseline arrangement.

FIG. 3 shows the result of an experiment to test the burst strength of the air-bag 5 upon inflation. The maximum pressure reached within the air-bag 5 before the air-bag bursts or ruptures is shown by the peaks of the lines of the graph.

A first line 26 shows the baseline pressure readings during inflation of an air-bag in which a tether is attached to the air-bag in a conventional manner. In this comparative example, the tether is attached to the air-bag by being interwoven with thirteen single adjacent warp yarns.

The second line 27 of the graph shown in FIG. 3 represents the measured pressure within the air-bag 5 of an embodiment of the invention. In this embodiment, the tether 8 is attached to the air-bag 5 by an attachment arrangement 9 in which the tether 8 passes partly around three adjacent warp yarns in the first portion 10, the tether 8 is interwoven with thirteen single adjacent warp yarns in the second portion 11 and the tether 8 passes partly around three adjacent warp yarns in the third portion 12.

It is clear from the graph shown in FIG. 3 that when the tether is attached to the air-bag in accordance with an embodiment of the invention, the air-bag can withstand a higher pressure before bursting than the baseline conventional arrangement.

Figure 4:
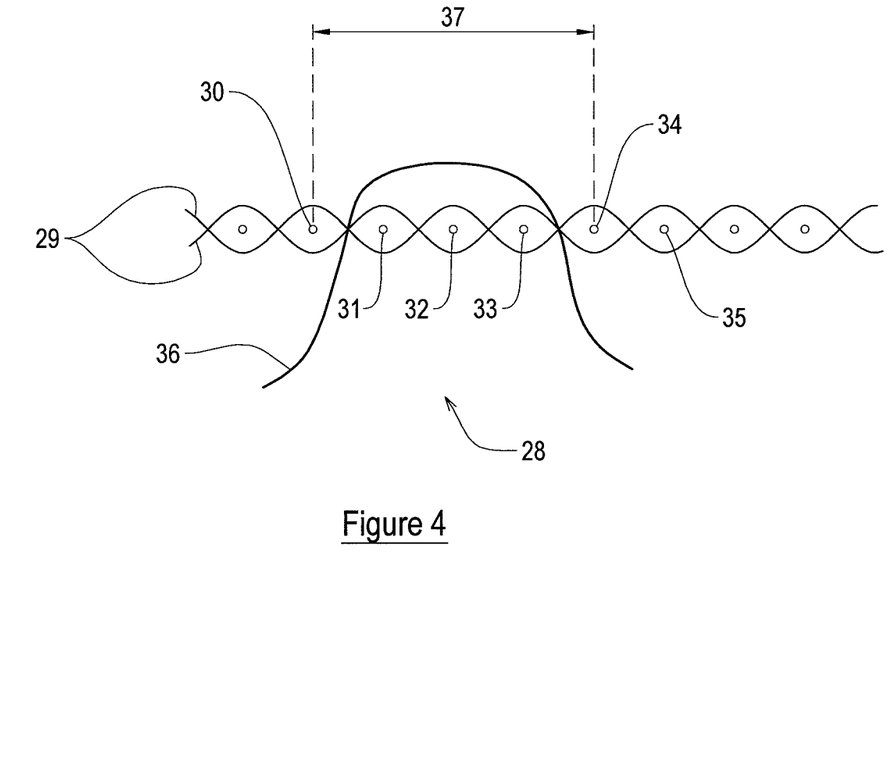
FIG. 4 is a diagrammatic sectional view of a further embodiment of the invention with a tether attached to an air-bag.

Referring now to FIG. 4, a further embodiment of the invention comprises a section of an air-bag 28 formed from weft yarns 29 and warp yarns 30-35. A tether 36 is attached to the air-bag 28 by an attachment arrangement 37. The attachment arrangement 37 comprises at least three warp yarns 31-33 of the air-bag 28.

Part of the tether 36, formed by at least one tether yarn, passes between two warp yarns 30, 31 from a first side of the air-bag 28 to a second side of the air-bag 28 and then passes partly around at least three warp yarns 31-33 on the second side of the air-bag 28. In further embodiments, the tether 36 passes partly around more than three warp yarns on the second side of the air-bag 28. The tether 36 then passes between two warp yarns 33, 34 of the air-bag 28 from the second side of the air-bag 28 to the first side of the air-bag 28.

In this embodiment, the tether 36 is not interwoven with single adjacent yarns of the air-bag 28.

This embodiment allows the tether 36 to move relative to the yarns of the air-bag 28 upon inflation. Energy is absorbed as the tether 36 moves relative to the air-bag 28. The energy absorption minimises the possibility of the tether 36 breaking when the air-bag 28 is inflated.

Figure 5:
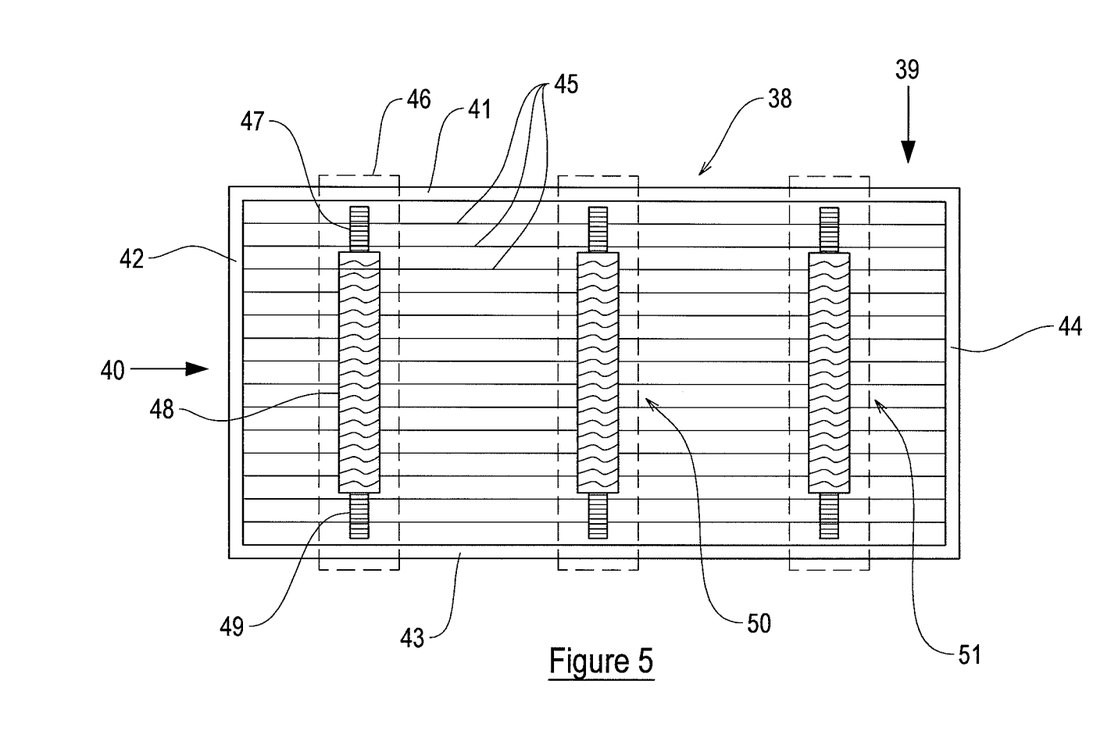
FIG. 5 is a diagrammatic view of an air-bag of a further embodiment of the invention.

Referring now to FIG. 5, one embodiment of the invention comprises a safety device in the form of an air-bag 38 which is an inflatable curtain air-bag or a pedestrian-protecting air-bag. The air-bag 38 is woven from warp yarns substantially aligned with the direction indicated by arrow 39 and weft yarns substantially aligned with the direction indicated by arrow 40. The air-bag 38 incorporates seams 41-44 at its edges. Tether yarns 45 are connected to the air-bag 38 by a connection arrangement 46 which comprises at least a first portion 47 and a second portion 48. In this embodiment, the connection arrangement comprises a third portion 49. In other embodiments, the third portion 49 of the connection arrangement 46 is omitted.

The tether yarns 45 are connected to an upper layer of the air-bag 38 at the first portion 47 of the connection arrangement 46 by part of each of the tether yarns 45 passing between two yarns of the air-bag 38 from a first side of the air-bag 38 to a second side of the air-bag 38 and then partly around at least three yarns on the second side of the air-bag 38, in the configuration as shown in FIG. 4 and as described above.

The tether yarns 45 are connected to the air-bag 38 at the second portion 48 of the connection arrangement 46 by being inter-woven between at least seven single adjacent yarns of the air-bag 38 in the same manner as the second portion 11 of the attachment arrangement 9 shown in FIG. 2 and as described above.

In this embodiment, the first and second portions 47, 48 of the connection arrangement 46 are adjacent one another and the first portion 47 of the connection arrangement 46 is positioned adjacent a seam 41 of the air-bag 38 such that the first portion 47 is positioned between the seam 41 and the second portion 48 of the connection arrangement 46. This embodiment has the benefit of the first portion 47 of the connection arrangement 46 which is adjacent the seam 41 absorbing energy to minimise the possibility of the tether yarns 45 breaking. The second portion 48 of the connection arrangement 46 provides the further benefit of a strong connection between the tether yarns 45 and the air-bag 38.

In this embodiment, the third portion 49 of the connection arrangement 46 is the same connection type as the first portion 47. The third portion 49 allows energy to be absorbed from the tether yarns 45 adjacent the seam 43 of the air-bag 38 in a similar manner to the first portion 47 of the connection arrangement 46 as described above.

In this embodiment, the tether yarns 45 are also connected to the air-bag 38 by second and third connection arrangements 50, 51 which are identical to the first connection arrangement 46 as described above. However, in other embodiments, the tether yarns 45 are connected to the air-bag 38 by only one connection arrangement or by more than three connection arrangements.

Embodiments of the invention are described above with a tether passing between or partly around warp yarns of an air-bag. However, in other embodiments, the tether passes between and at least partly around weft yarns of an air-bag.

Embodiments of the invention may be incorporated in any type of safety device which comprises an airbag and a tether. In one embodiment, a tether is attached within an inflatable curtain (IC) type air-bag. In another embodiment, a tether is attached to a pedestrian-protecting air-bag. In a further embodiment, the tether is attached to an air-bag which is packed inside a vehicle air-bag module.

In the present specification "comprise" means "includes or consists of" and "comprising" means "including or consisting of".

The invention claimed is:

1. A safety device for use in a vehicle, the safety device comprising:
an air-bag configured to be inflated by a source of gas, at least part of the air-bag being woven and including a plurality of generally parallel woven yarns; and an elongate tether, the tether being connected to a layer of the air-bag by a connection arrangement, the connection arrangement including:
a first portion in which part of the tether passes between two adjacent yarns of the layer of the air-bag from a first side of the air-bag to a second side of the layer of the air-bag and partly around at least two adjacent yarns of the air-bag on the second side of the layer of the air-bag;
a second portion in which part of the tether is interwoven with a predetermined number of single adjacent yarns of the layer of the air-bag; and
a third portion in which part of the tether passes between two adjacent yarns of the air-bag from the first side of the air-bag to the second side of the air-bag and partly around at least two adjacent yarns of the layer of the air-bag on the second side of the air-bag,
wherein the first, second and third parts are all woven into a common fabric layer of the air-bag; and
wherein the tether is formed of a plurality of woven tether yarns and at least one of the tether yarns is interwoven with the plurality of generally parallel woven yarns.

2. The safety device of claim 1, wherein in the first portion of the connection arrangement, the tether passes partly around at least three adjacent yarns of the air-bag on the second side of the layer of the air-bag.

3. The safety device of claim 1, wherein in the second portion of the connection arrangement, the tether is interwoven with at least seven adjacent single yarns of the layer of the air-bag, the at least seven single adjacent yarns all in a common fabric layer.

4. The safety device of claim 1, wherein in the second portion of the connection arrangement, the tether is interwoven with at least thirteen adjacent single yarns of the layer of the air-bag.

5. The safety device of claim 1, wherein in the third portion of the connection arrangement, the tether passes partly around at least three adjacent yarns of the layer of the air-bag on the second side of the layer of the air-bag.

6. The safety device of claim 1, wherein the second portion is between and immediately adjacent the first portion and the third portion.

7. The safety device of claim 1, wherein the second portion of the tether is greater in length than the first portion and greater in length than the third portion.

8. The safety device of claim 1, wherein the second portion of the tether is interwoven between at least six single adjacent yarns and the first and third portions of the tether pass around a lesser number of adjacent yarns on the second side, the at least six single adjacent yarns all in a common fabric layer.

9. The safety device of claim 1, wherein the tether is a flexible elongate tether.

10. The safety device of claim 1, wherein the tether is only woven into the layer of the air-bag at the first, second and third portions.

11. A method of manufacturing a safety device for use in a vehicle, the method comprising:
weaving part of an air-bag to include a plurality of generally parallel woven yarns;
providing an elongate tether; and
connecting the tether to a layer of the air-bag by a connection arrangement; and
forming the connection arrangement by:
passing a first part of the tether between two adjacent yarns of the layer of the air-bag from a first side of the layer of the air-bag to a second side of the layer of the air-bag and partly around at least two adjacent yarns of the air-bag on the second side of the layer of the air-bag;
interweaving a second part of the tether with a predetermined number of single adjacent yarns of the layer of the air-bag; and
passing a third part of the tether between two adjacent yarns of the air-bag from the first side of the layer of the air-bag to the second side of the layer of the air-bag and partly around at least two adjacent yarns of the layer of the air-bag on the second side of the air-bag,
wherein the first, second and third portions are all woven into a common fabric layer of the air-bag, and
wherein the tether is formed of a plurality of woven tether yarns and at least one of the tether yarns is interwoven with the plurality of generally parallel woven yarns.

12. The method of claim 11, further comprising:
passing the first part of the tether partly around at least three adjacent yarns of the layer of the air-bag on the second side of the layer of the air-bag.

13. The method of claim 11, further comprising:
interweaving the second part of the tether with at least seven single adjacent yarns of the layer of the air-bag, the at least seven single adjacent yarns all in a common fabric layer.

14. The method of claim 11, further comprising:
interweaving the second part of the tether with at least thirteen single adjacent yarns of the layer of the air-bag; and
passing the third part of the tether partly around at least three adjacent yarns of the layer of the air-bag on the second side of the layer of the air-bag.

15. The method of claim 11, wherein the second part of the tether is greater in length than the first part and greater in length than the third part.

16. The method of claim 11, wherein the second part of the tether is interwoven between at least six single adjacent yarns and the first and third parts of the tether pass around a lesser number of adjacent yarns on the second side, the at least six single adjacent yarns all in a common fabric layer.

17. The method of claim 11, wherein the tether is a flexible elongate tether.

18. The method of claim 11, wherein the tether is only woven into the layer of the air-bag at the first, second and third portions.

* * * * *